United States Patent [19]

Saeki et al.

[11] Patent Number: 4,459,377

[45] Date of Patent: Jul. 10, 1984

[54] SHELL-MOLDING RESIN COATED SAND

[75] Inventors: Yukio Saeki; Tosaku Amakawa; Shigeru Nemoto, all of Fujieda, Japan

[73] Assignee: Sumitomo Durez Company, Ltd., Tokyo, Japan

[21] Appl. No.: 479,778

[22] Filed: Mar. 28, 1983

[30] Foreign Application Priority Data

Mar. 31, 1982 [JP]  Japan .................................. 57-54676

[51] Int. Cl.³ .............................................. C08K 5/06
[52] U.S. Cl. .................................... 523/145; 523/147; 524/372
[58] Field of Search ................ 523/145, 147; 524/372; 428/404

[56] References Cited

U.S. PATENT DOCUMENTS

| | | | |
|---|---|---|---|
| 3,917,558 | 11/1975 | Gardikes et al. | 523/145 |
| 4,252,700 | 2/1981 | Funabiki et al. | 523/145 |
| 4,290,928 | 9/1981 | Funabiki et al. | 523/145 |
| 4,336,179 | 6/1982 | Iyer | 523/145 |
| 4,379,866 | 4/1983 | Henry et al. | 523/145 |

FOREIGN PATENT DOCUMENTS 950291 2/1964 United Kingdom ................ 523/145

Primary Examiner—Lewis T. Jacobs
Attorney, Agent, or Firm—James F. Tao; James F. Mudd

[57] ABSTRACT

An improved resin coated sand for use in foundry shell-molding applications is disclosed which has increased resistance to thermal shock at the time of pouring. The improved product uses a phenolic resin as binder with aromatic compounds selected from the following generic formulae:

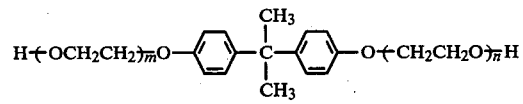

and/or,

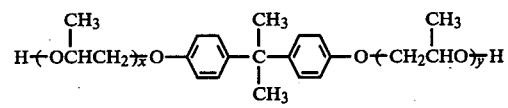

wherein m, n, x and y are integers. The foundry aggregates are mixed with the phenolic resin and organic compounds under conventional mixing conditions to form a sand-resin mixture that can be formed into shell-molds. Upon casting the molten metal into these molds, the abrupt thermal expansion of the coated sand is controlled to eliminate the cracking that occurs when conventional phenolic-sand mixtures are employed.

15 Claims, 1 Drawing Figure

SHELL-MOLDING RESIN COATED SAND

BACKGROUND OF THE INVENTION

This invention relates to an improved resin coated sand for use in shell-molding foundry operations, to eliminate the problems of thermal shock caused when hot metal is cast into the mold. In conventional sand molding operations, a mixture of sand coated with resin binder is placed in a mold, and the heat of the processing steps causes reactions between the binder components to improve the pressed strength of the sand and retain the configuration of the part to be cast.

Upon introduction of the molten metal into the mold, the temperature difference between the molten metal and the mold is great, and the heat of molten metal is transferred to the mold creating thermal shock in the mold, which may create cracks and fissures in the sand mold. The abrupt expansion caused by the temperature differential, destroys the binding action of conventional phenolic binders and cracks and rupture of the mold occur.

The effect of the heat of the molten metal upon the binder is advantageous, since this heat destroys the binder holding the sand or aggregate, and allows, upon cooling, the easy removal of the sand from the cast molded part. The sand is removed by tapping or flogging the molten part to remove the particles. This is known as the shake out property of the mold.

Therefore a resin mixture must be selected that will provide adequate thermal shock protection as well as allow simple removal of the binder-aggregate from the cast item.

A known method to solve the drawback for preventing the molds from cracks has been adopted by means of incorporating cushioning substances into phenolic resins or coated sand obtained therefrom. This method can make the molds flexible as well as free from stress at heating thereof. Said conventional cushioning substances are Vinsol, bisphenol A, petroleum resins, rosin, etc. While these substances play a role of cushioning effect in the molds to a certain extent, they have drawbacks in that they emit a disagreeable odor at pouring, due to a thermal decomposition or evaporation thereof. Also, the molds containing such materials are poor in the shake-out property.

After much investigation to overcome said drawbacks, the inventors hereof have found that phenolic resins in the presence of the following aromatic substances or compounds having generic formulae:

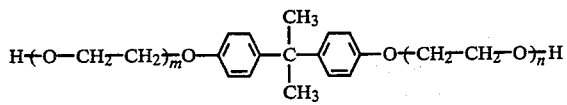

where, both m and n represent positive integers, and/or

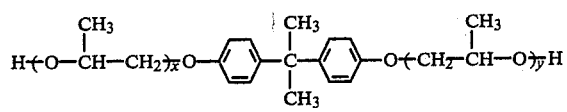

where, both x and y represent positive integers, prevent the molds from cracks at pouring, free from said disagreeable odors, and do not impair the shake-out property.

SUMMARY OF THE INVENTION

This invention discloses method to improve the resistances to thermal shock of phenolic resins employed as binders in sand molding foundry operations. Incorporated into the resin or resin-sand mixture is a compound or compounds selected from the following generic formulae:

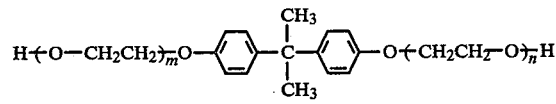

and/or

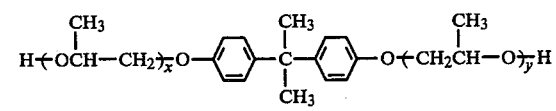

where m, n, x and y are integers. The incorporation of compounds having the above structure also provide good shake-out properties for castings made in shell molds using this binder. The phenolic resin may be of the resole or novolac type or a mixture of the two phenolic resins.

DESCRIPTION OF THE DRAWING

The FIGURE is a side view of the test device used to determine the shake-out property of the cured resin coated sand.

DETAILED DESCRIPTION OF THE INVENTION

Figure 1:
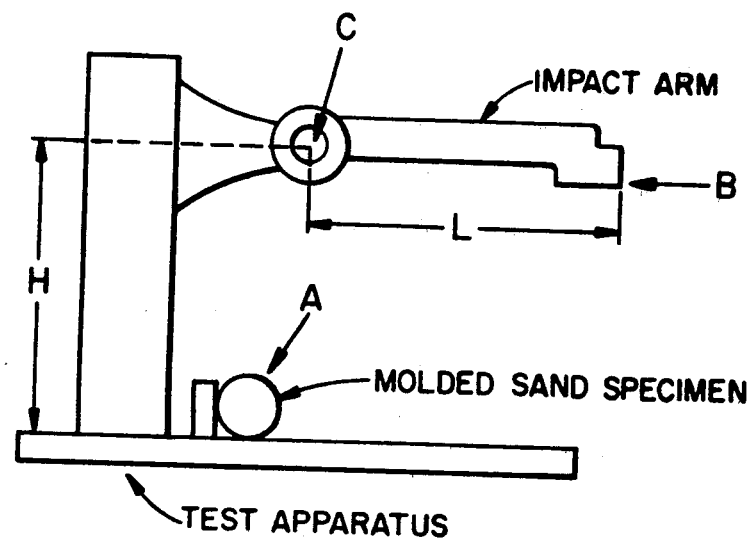

Conventional shell molding operations employ coated foundry sand or aggregates prepared by mixing heated sand with a phenolic resin until an uniform dispersion is obtained. Catalysts and fillers can be added if desired. The phenolic resin can be selected from novolac resins, resole resins or mixtures thereof.

Novolac type phenolic resins are generally prepared by reacting 1 mole of phenols with 0.6 to 0.9 moles of aldehydes in the presence of acidic catalysts, as their molar proportion range. Resole type phenolic resins are generally prepared by reacting 1 mole of phenols with 1 to 3 moles of aldehydes in the presence of basic catalysts, as their molar proportion range.

The inventors hereof have found that the presence of aromatic substances selected from the following generic formulae:

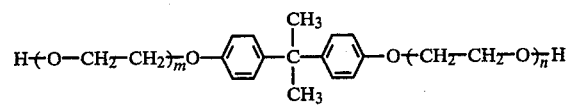

where, both m and n represent positive integers, respectively, and/or

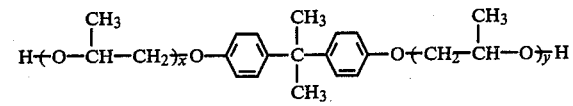

where, both x and y represent positive integers, respectively, prevent the molds from cracks at pouring, and do not impair the shake-out property of the molds.

The phenolic resins used in the present invention are any of the novolac, the resole type or a mixture thereof. Phenols for preparing said phenolic resins are phenol, cresol, xylenol, etc., however, they are usable in the presence of resorcin, cathecol, hydroquinone, aniline, urea, melamine, cashew nut shell oil, etc. Formaldehyde for preparing said phenolic resins is selected from formalin, paraformaldehyde, trioxane, etc. Catalysts for the reaction of phenol and formaldehyde are one or more of acidic substances generally such as oxalic, hydrochloric and sulfuric acid, and organic metal salts for novolac type resin preparation. Basic substances used as catalysts for resole type resin preparation are generally selected from primary amines such as ammonia and ethyl amine; secondary amines such as ethylene diamine and diethyldiamine; tertiary amines such as triethylamine; hydroxides of alkali metals such as sodium hydroxide and potassium hydroxide; and hydroxide of alkali earth metals such as calcium hydroxide and magnesium hydroxide.

The most preferable incorporating proportion range of said aromatic substances is 0.5 to 40 parts by weight into 100 parts by weight of phenolic resins. When it is less than 0.5 parts by weight, it does not prevent mold cracking. When it is more than 40 parts by weight, it impairs the strength of the molds. The aromatic compound can be selected from either of the generic formula shown above, or a mixture of compounds selected from each formula may be used to assist in reducing the thermal shock when casting.

The proper time for incorporating said aromatic substances during the process of preparing phenolic resin is optional: at the beginning, during or after reacting phenols with formaldehyde. Alternatively, after preparing said solid phenolic resin, said aromatic substances are incorporated thereinto by mix-grinding or melt-mixing with a kneading machine such as an extruder. It is also possible to incorporate the aromatic substances during the resin coated sand production steps; the proper time for incorporating the aromatic substances thereinto is optinoal: prior to, during or after adding the phenolic resin thereinto. The aromatic substances are incorporated either as they are, or as dispersed in a medium. Any incorporating method reduces the abrupt thermal expansion of shell-molds obtained from resin coated sand thus produced.

Lubricants are usable according to the present invention, which are ordinary ones, however, preferable are ethylene bis-stearic amide, methylene bis-stearic amide, oxy-stearic amide stearic amide and methylol stearic amide. Lubricant-containing phenolic resins can be obtained by adding said lubricant to phenolic resins at any stage of their preparation; prior to, during or after the reaction.

Methods for producing resin coated sand in the present invention may be any of the commercial hot-coating, semi-hot-coating, cold-coating, and powder-solvent coating, however, hot-coating is preferably recommended for the present invention.

The inventors hereof will explain the present invention by the following nonlimitative Examples and Comparative Examples, wherein "parts" and "percent" indicate "parts by weight" and "percent by weight", respectively.

PREPARATION EXAMPLES 1, 2, 3 AND 4

To a reaction kettle with a reflux cooler and a stirrer, 1000 parts of phenol, 650 parts of 37% formalin, and 10 parts of oxalic acid were charged. The temperature of the mixture was gradually elevated, and upon reaching 96° C., it was held at that temperature for 120 minutes' reflux, 10 parts of methylene bis-stearic amide and 100 parts of the following polyethylene glycol (I) were added thereto. After the mixture was mixed well, it was dehydrated under vacuum and discharged from the kettle. Thus, a lubricant-containing novolac type phenolic resin was obtained.

Except for changing the kind of aromatic substances from the following (I) to (II), (III) and (IV), respectively, the same operations were run, and each novolac type phenolic resin was obtained:

Preparation Aromatic substances used in each Preparation Example

| Example No. | |
|---|---|
| 1 | I $HOCH_2CH_2O-\langle\rangle-\overset{CH_3}{\underset{CH_3}{C}}-\langle\rangle-OCH_2CH_2OH$ |
| 2 | II $H(OCH_2CH_2)_{40}-O-\langle\rangle-\overset{CH_3}{\underset{CH_3}{C}}-\langle\rangle-O(CH_2CH_2)_{40}-H$ |
| 3 | III $\overset{CH_3}{\underset{}{HOCHCH_2O}}-\langle\rangle-\overset{CH_3}{\underset{CH_3}{C}}-\langle\rangle-O(CH_2\overset{CH_3}{\underset{}{CHO}})_{2}H$ |
| 4 | IV $H(O\overset{CH_3}{\underset{}{CHCH_2}})_{4}O-\langle\rangle-\overset{CH_3}{\underset{CH_3}{C}}-\langle\rangle-O(CH_2\overset{CH_3}{\underset{}{CHO}})_{4}H$ |

PREPARATION EXAMPLES 5 AND 6

To a reaction kettle with a reflux cooler and a stirrer, 1000 parts of phenol, 1795 parts of 37% formalin, 160 parts of 28% aqueous ammonia, and 60 parts of 50% sodium hydroxide solution were charged. The temperature of the mixture was gradually elevated, and upon reaching 90° C., it was held for 30 minutes' reflux, 40 parts of ethylene bis-stearic amide and 110 parts of said aromatic substance (III) were added. After the mixture was mixed well, it was dehydrated under vacuum, discharged from the kettle and chilled quickly. Thus, a lubricant-containing solid resole type phenolic resin was obtained as Preparation Example 5. The same operation was run by changing the quantity of the aromatic substance (III) from 110 to 165 parts, another solid resole type phenolic resin was obtained as Preparation Example 6.

PREPARATION EXAMPLE 7

To a reaction kettle with a reflux cooler and a stirrer, 1000 parts of phenol, 650 parts of 37% formalin, and 10 parts of oxalic acid were charged. The temperature of the mixture was gradually elevated, and upon reaching 96° C., it was held for 30 minutes' reflux, 10 parts of methylene bis-stearic amide were added thereto. After the mixture was mixed well, it was dehydrated under vacuum, and discharged from the kettle. Thus 970 parts of a novolac type phenolic resin was obtained.

PREPARATION EXAMPLE 8

To a reaction kettle with a reflux cooler and a stirrer, 1000 parts of phenol, 1795 parts of 37% formalin, 160 parts of 28% aqueous ammonia, and 60 parts of 50% sodium hydroxide solution were charged. The temperature of the mixture was gradually elevated, and upon reaching 96° C., it was held for 30 minutes' reflux, 40 parts of methylene bis-stearic amide were added thereto. After the mixture was mixed well, it was dehydrated under vacuum, discharged from the kettle, and chilled quickly. Thus, 1100 parts of a solid resole type phenolic resin was obtained.

EXAMPLE 1

Preheated at 130° to 140° C., 7000 parts of Sanei No. 6 silica sand were charged into a whirl-mixer. After 140 parts of novolac type phenolic resin obtained according to Preparation Example 1 was added and mixed for 40 seconds, 21 parts of hexamethylene tetramine dissolved in 105 parts of water were added thereto. Mixing was continued until it crumbled. 7 parts of calcium stearate were added thereto, and after 30 seconds mixing, discharged and aerated. A resin coated sand was obtained.

EXAMPLE 2

Except for using novolac type phenolic resin obtained according to Preparation Example 2, a resin coated sand was obtained by the same procedure as Example 1.

EXAMPLE 3

Except for using novolac type phenolic resin obtained according to Preparation Example 3, a resin coated sand was obtained by the same procedure as Example 1.

EXAMPLE 4

Except for using novolac type phenolic resin obtained according to Preparation Example 4, a resin coated sand was obtained by the same procedure as Example 1.

EXAMPLE 5

Preheated at 130° to 140° C., 7000 parts of Sanei No. 6 silica sand were charged into a whirl-mixer. After 140 parts of resole type phenolic resin obtained according to Preparation Example 1 was added, they were mixed for 40 seconds, and 105 parts of cooling water were added thereto. The mixture was further mixed until it crumbled. 7 parts of calcium stearate were added thereto, mixed for 30 seconds, discharged and aerated. A resin coated sand was obtained.

EXAMPLE 6

Except for using resole type phenolic resin obtained according to Preparation Example 6, a resin coated sand was obtained by the same procedure as Example 5.

EXAMPLE 7

Preheated at 130° to 140° C., 7000 parts of Sanei No. 6 silica sand were charged into a whirl-mixer and 130 parts of novolac type phenolic resin obtained according to Preparation Example 7 was added thereto. Followed by 20 seconds mixing, 13 parts of aromatic substance (III) were added thereto. After mixing for 20 seconds, 21 parts of hexamethylene tetramine dissolved in 105 parts of water were added thereto. The mixture was further mixed until it crumbled. 7 Parts of calcium stearate was added thereto, followed by 30 seconds mixing, the mixture was discharged and aerated. A resin coated sand was obtained.

EXAMPLE 8

Preheated at 130° to 140° C., 7000 parts of Sanei No. 6 silica sand were charged into a whirl mixer. After 13 parts of said aromatic substance (IV) was added thereto, they were mixed for 20 seconds. Successively 78 parts of lubricant-containing novolac type phenolic resin according to Preparation Example 7 and 52 parts of lubricant-containing resole type phenolic resin according to Preparation Example 8 were added thereto, and mixed for 20 seconds. Then, 13 parts of hexamethylene tetramine dissolved in 63 parts of water added thereto. The mixture was mixed until it crumbled. 7 parts of calcium stearate were added thereto, mixed for 30 seconds, discharged and aerated. A resin coated sand was obtained.

EXAMPLE 9

Preheated at 130° to 140° C., 7000 parts of Sanei No. 6 silica sand were charged into a whirl-mixer. After 7 parts of said aromatic substance (I) and 6 parts of said aromatic substance (IV) were added thereto, and mixed for 20 seconds. Successively, 78 parts of lubricant-containing novolac type phenolic resin according to Preparation Example 7 and 52 parts of lubricant-containing resole type phenolic resin according to Preparation Example 8 were added thereto, and mixed for 20 seconds. Then 13 parts of hexamethylene tetramine dissolved in 63 parts of water were added thereto. The mixture was mixed until it crumbled. 7 parts of calcium stearate were added thereto, mixed for 30 seconds, discharged, and aerated. A resin coated sand was obtained.

COMPARATIVE EXAMPLE 1

Preheated at 130° to 140° C., 7000 parts of Sanei No. 6 silica sand were charged into a whirl-mixer. After 140 parts of novolac type phenolic resin obtained according to Preparation Example 7 were added thereto, and mixed for 40 seconds, and 21 parts of hexamethylene tetramine dissolved in 105 parts of water were added thereto. The mixture was mixed until it crumbled. 7 parts of calcium stearate were added thereto, mixed for 30 seconds, discharged and aerated. A resin coated sand was obtained.

COMPARATIVE EXAMPLE 2

Preheated at 130° to 140° C., 7000 parts of Sanei No. 6 silica sand were charged into a whirl-mixer. After 140 parts of resole type phenolic resin obtained according to Preparation Example 8 was added and mixed for 40 seconds, 105 parts of cooling water were added thereto. The mixture was mixed until it crumbled. 7 parts of calcium stearate were added thereto, mixed for 30 seconds, discharged and aerated. A resin coated sand was obtained.

Table 1 indicates the characteristics of various kinds of resin coated sand obtained according to Examples 1, 2, 3, 4, 5, 6, 7, 8 and 9 and Comparative Examples 1 and 2 as well as the abrupt thermal expansion rate and the shake-out property of shell-molds obtained therefrom.

TABLE 1

|  |  | Example | | | | | | | | | Comparative Example | |
|---|---|---|---|---|---|---|---|---|---|---|---|---|
|  |  | 1 | 2 | 3 | 4 | 5 | 6 | 7 | 8 | 9 | 1 | 2 |
| Preparation Example (phenolic resin used) | | 1 | 2 | 3 | 4 | 5 | 6 | 7 | 7 + 8 | 7 + 8 | 7 | 8 |
| Aromatic substance | | I | II | III | IV | III | III | III | IV | I + IV | — | — |
| Weight proportion of aromatic substance to 100 parts of phenolic resin | | 10 | 10 | 10 | 10 | 10 | 15 | 10 | 10 | 10 | 0 | 0 |
| Coated sand | Stick point (°C.) | 101 | 100 | 98 | 97 | 96 | 95 | 98 | 99 | 100 | 102 | 98 |
| Shell-mold | Bending strength (kg/cm$^2$) | 32.5 | 32.2 | 35.5 | 36.3 | 31.2 | 32.5 | 35.6 | 30.0 | 30.5 | 30.1 | 28.9 |
|  | Tensile 30 sec. | 2.2 | 2.3 | 2.3 | 2.2 | 1.7 | 1.7 | 2.3 | 2.0 | 2.1 | 2.5 | 1.9 |
|  | strength 60 sec. | 4.7 | 5.0 | 5.0 | 5.1 | 2.9 | 3.1 | 4.9 | 4.3 | 4.5 | 5.0 | 3.1 |
|  | under heat 90 sec. (kg/cm$^2$) at 250° C. | 7.8 | 8.1 | 8.0 | 8.1 | 6.4 | 6.5 | 8.0 | 7.5 | 7.6 | 8.2 | 6.6 |
|  | Abrupt thermal expansion rate (%) | 1.14 | 0.84 | 0.82 | 0.83 | 1.00 | 0.97 | 0.83 | 0.92 | 1.00 | 1.50 | 1.63 |
|  | Shake-out property (times) | 29 | 31 | 30 | 30 | 27 | 26 | 30 | 28 | 29 | 32 | 29 |

Procedures used for testing of samples in Table 1
Bending strength: according to JACT Method SM-1
Stick point: according to JACT Method C-1
Tensile strength under elevated temperature: according to JACT Method SM-10
Abrupt thermal expansion rate: according to JACT Method SM-7 at 1000° C.
Shake-out property:
  Preparation of specimen: Coated sand is fed into an iron pipe of 29 mm in diameter and 150 mm length. After 30 minutes' baking, it is covered with aluminum foil and further heated for 3 hours at 370° C. After cooling, the sand molded pipe is removed.
Test method: The specimen is flogged by the impact arm of the apparatus illustrated in FIG. 1. Crumbled sand is removed from the pipe after each flogging. Weighing the residual molded sand of the specimen until it becomes zero, and the shake-out property is defined by the number of floggings required.
Test apparatus: In FIG. 1, A is a molded sand specimen and B is the arm which revolves around pivot C set at 30 cm high. Said arm is at first set horizontally, and then allowed to drop so as to flog the specimen.

We claim:

1. A resin coated sand for shell molding foundry applications comprising foundry aggregates coated with phenolic resin and aromatic compounds, said aromatic compounds are selected from either or both of the following generic formulae:

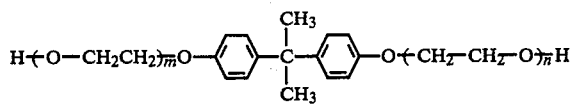

and

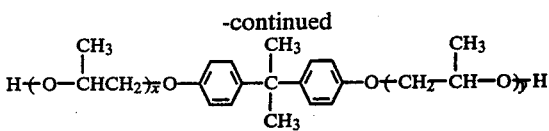

where m, n, x and y are integers and the range of aromatic compounds is about 0.5 to about 40 parts by weight aromatic compounds to 100 parts by weight of phenolic resin.

2. A resin coated sand for shell molding foundry applications according to claim 1, wherein one or more of said aromatic compounds are selected from the generic formulae:

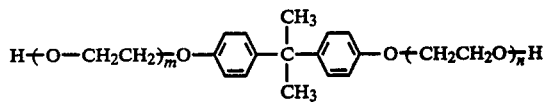

where m and n are integers.

3. A resin coated sand for shell molding foundry applications according to claim 1, wherein one or more of said aromatic compounds are selected from the generic formulae:

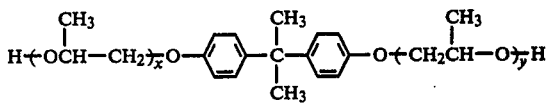

where x and y are integers.

4. A resin coated sand for shell molding foundry applications according to claim 1, wherein said phenolic resin is a novolac phenolic resin.

5. A resin coated sand for shell molding foundry applications according to claim 2, wherein said phenolic resin is a novolac phenolic resin.

6. A resin coated sand for shell molding foundry applications according to claim 3, wherein said phenolic resin is a novolac phenolic resin.

7. A resin coated sand for shell molding foundry applications according to claim 1, wherein said phenolic resin is a resole phenolic resin.

8. A resin coated sand for shell molding foundry applications according to claim 2, wherein said phenolic resin is a resole phenolic resin.

9. A resin coated sand for shell molding foundry applications according to claim 3, wherein said phenolic resin is a resole phenolic resin.

10. A resin coated sand for shell molding foundry applications according to claim 1, wherein said phenolic resin is a mixture of a resole phenolic resin and a novolac phenolic resin.

11. A resin coated sand for shell molding foundry applications according to claim 2, wherein said phenolic resin is a mixture of a resole phenolic resin and a novalac phenolic resin.

12. A resin coated sand for shell molding foundry applications according to claim 3, wherein said phenolic resin is a mixture of a resole phenolic resin and a novolac phenolic resin.

13. A resin coated sand for shell molding foundry applications according to claim 1, additionally comprising a lubricant.

14. A resin coated sand for shell molding foundry applications according to claim 2, additionally comprising a lubricant.

15. A resin coated sand for shell molding foundry applications according to claim 3, additionally comprising a lubricant.

* * * * *